United States Patent
Huh

(10) Patent No.: US 11,479,231 B2
(45) Date of Patent: Oct. 25, 2022

(54) DEVICE AND METHOD FOR CONTROLLING DRIVING OF ELECTRIC FOUR-WHEEL DRIVE VEHICLE

(71) Applicants: HYUNDAI MOTOR COMPANY, Seoul (KR); KIA MOTORS CORPORATION, Seoul (KR)

(72) Inventor: Jee Wook Huh, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 248 days.

(21) Appl. No.: 16/995,474

(22) Filed: Aug. 17, 2020

(65) Prior Publication Data
US 2021/0316712 A1   Oct. 14, 2021

(30) Foreign Application Priority Data
Apr. 13, 2020 (KR) .................. 10-2020-0044480

(51) Int. Cl.
| | |
|---|---|
| *B60W 20/00* | (2016.01) |
| *B60W 10/06* | (2006.01) |
| *B60W 10/08* | (2006.01) |
| *B60W 10/02* | (2006.01) |
| *B60W 30/188* | (2012.01) |
| *B60K 17/354* | (2006.01) |
| *B60K 17/356* | (2006.01) |
| *B60W 10/10* | (2012.01) |

(52) U.S. Cl.
CPC ........... *B60W 20/00* (2013.01); *B60K 17/354* (2013.01); *B60K 17/356* (2013.01); *B60W 10/02* (2013.01); *B60W 10/06* (2013.01); *B60W 10/08* (2013.01); *B60W 10/10* (2013.01); *B60W 30/188* (2013.01); *B60W 2510/244* (2013.01); *B60W 2520/28* (2013.01)

(58) Field of Classification Search
CPC ...... B60W 20/00; B60W 10/02; B60W 10/06; B60W 10/08; B60W 10/10; B60W 30/188; B60W 2510/244; B60W 2520/28; B60K 17/354; B60K 17/356
See application file for complete search history.

(56) References Cited

U.S. PATENT DOCUMENTS

| | | | |
|---|---|---|---|
| 2001/0015299 A1* | 8/2001 | Moore ...................... | B60K 6/40 180/197 |
| 2002/0010538 A1* | 1/2002 | Uchida ................... | B60W 10/08 180/65.245 |
| 2004/0163860 A1* | 8/2004 | Matsuzaki ............... | B60K 6/44 290/46 |

(Continued)

*Primary Examiner* — George C Jin
(74) *Attorney, Agent, or Firm* — Lempia Summerfield Katz LLC

(57) ABSTRACT

A device for controlling an electronic four-wheel drive (E-4WD) of a vehicle includes: a first powertrain for a front wheel, where the first powertrain includes an engine, and a front wheel motor; and a second powertrain for a rear wheel, where the second powertrain includes a rear wheel motor. The device provides a rear wheel motor driving mode, a front wheel motor driving mode, a combined driving mode in which the front wheel motor and the rear wheel motor are both driven, and an engine-on mode according to driver power demand for the vehicle, such that fuel efficiency of the vehicle is improved.

20 Claims, 7 Drawing Sheets

(56) References Cited

U.S. PATENT DOCUMENTS

| | | | |
|---|---|---|---|
| 2014/0121870 A1* | 5/2014 | Lee | B60W 30/16 |
| | | | 477/3 |
| 2019/0152469 A1* | 5/2019 | Kim | B60K 6/442 |
| 2019/0232798 A1* | 8/2019 | Ienaga | B60W 10/08 |
| 2020/0189398 A1* | 6/2020 | Suzuki | B60T 8/1766 |
| 2020/0398843 A1* | 12/2020 | Sabbatini | B60W 30/18118 |

* cited by examiner

DEVICE AND METHOD FOR CONTROLLING DRIVING OF ELECTRIC FOUR-WHEEL DRIVE VEHICLE

CROSS-REFERENCE TO RELATED APPLICATION

This application claims priority to and the benefit of Korean Patent Application No. 10-2020-0044480, filed on Apr. 13, 2020, the entire contents of which are incorporated herein by reference.

FIELD

The present disclosure relates to a device and a method for controlling an electronic four-wheel drive (E-4WD) vehicle. More particularly, it relates to a device and a method for controlling driving of an E-4WD vehicle, in which an engine and a front wheel motor are connected to a front wheel, and a rear wheel motor is connected to a rear wheel.

BACKGROUND

The statements in this section merely provide background information related to the present disclosure and may not constitute prior art.

As it is well known, electric motors are provided as traveling driving sources in hybrid vehicles, electric vehicles, hydrogen fuel cell vehicles, and the like, and these vehicles are referred to as electrified vehicles.

As an example of a four-wheel drive (4WD) powertrain of the electrified vehicle, a powertrain in which an engine and/or a front wheel motor is connected to a front wheel and a rear wheel motor, which is smaller than the front wheel motor, is connected to a rear wheel may be applied to the electrified vehicle.

In one form, a 4WD powertrain may provide main driving sources for the vehicle by an engine and a front wheel motor, which are connected to a front wheel, and an auxiliary driving source by a rear wheel motor connected to a rear wheel. Since an optimized driving control method for vehicle traveling has not yet been established and, and the rear wheel motor remains at a level in which it is limitedly driven for driving assistance, application of a more efficient driving control method is desired.

In another form, a 4WD powertrain uses an engine connected to a front wheel as a main driving source for the vehicle traveling, and a rear wheel motor connected to a rear wheel as a secondary driving source when a loss of a driving force occurs due to operating of the engine during gear shifting of a transmission while traveling. The rear wheel motor operates to compensate for the loss of the driving force.

SUMMARY

In one aspect, the present disclosure provides a device and a method for controlling driving of an electronic four-wheel drive (E-4WD) vehicle, which achieve improvement in fuel efficiency by separately applying a rear wheel motor driving control mode, a front wheel motor driving control mode, a four-wheel motor driving control mode, and an engine-on control mode to driving control of a 4WD powertrain in which the engine and the front wheel motor is connected to a front wheel the rear wheel motor is connected to a rear wheel.

Objectives of the present disclosure are not limited to the above-described objectives, and other objectives of the present disclosure, which are not mentioned, can be understood by the following description and also will be apparently understood through forms of the present disclosure. Further, the objectives of the present disclosure can be implemented by means described in the appended claims and a combination thereof.

In an exemplary form, the present disclosure provides a device for controlling driving of an E-4WD vehicle, which includes a powertrain for a front wheel including an engine, a front wheel motor, an engine clutch arranged between the engine and the front wheel motor and configured to transmit or disconnect power of the engine, and a transmission configured to shift the power of the engine and power of the front wheel motor to output the shifted power to the front wheel; a powertrain for a rear wheel including a rear wheel motor and a decelerator configured to decelerate power of the rear wheel motor and output the decelerated power to the rear wheel; a battery connected to the front wheel motor and the rear wheel motor to be chargeable and dischargeable; and a controller configured to perform control for selectively driving the front wheel motor and the rear wheel motor according to power transmission efficiency of the front wheel motor and the rear wheel motor when driver demand power is smaller than total available power which is the sum of available power of the front wheel motor and available power of the rear wheel motor, control for driving the front wheel motor and the rear wheel motor together when the driver demand power is larger than the available power of the front wheel motor or the available power of the rear wheel motor while either the front wheel motor or the rear wheel motor is driven, and control for driving the engine according to an engine-on when the driver demand power is larger than the total available power.

In another exemplary form, the present disclosure provides a method of controlling driving of an electronic four-wheel drive (E-4WD) vehicle, which includes a powertrain for a front wheel having an engine, a front wheel motor, an engine clutch arranged between the engine and the front wheel motor and configured to transmit or disconnect power of the engine, and a transmission configured to shift the power of the engine and power of the front wheel motor to output the shifted power to the front wheel, a power train for a rear wheel including a rear wheel motor and a decelerator configured to decelerate power of the rear wheel motor and output the decelerated power to the rear wheel, and a battery connected to the front wheel motor and the rear wheel motor to be chargeable and dischargeable, the method including selectively driving the front wheel motor and the rear wheel motor according to power transmission efficiency of the front wheel motor and the rear wheel motor when driver demand power is smaller than total available power which is the sum of available power of the front wheel motor and available power of the rear wheel motor; driving the front wheel motor and the rear wheel motor together when the driver demand power is larger than the available power of the front wheel motor or the available power of the rear wheel motor while either the front wheel motor or the rear wheel motor is driven; and driving the engine according to an engine-on when the driver demand power is larger than the total available power.

Other aspects and exemplary forms of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7:
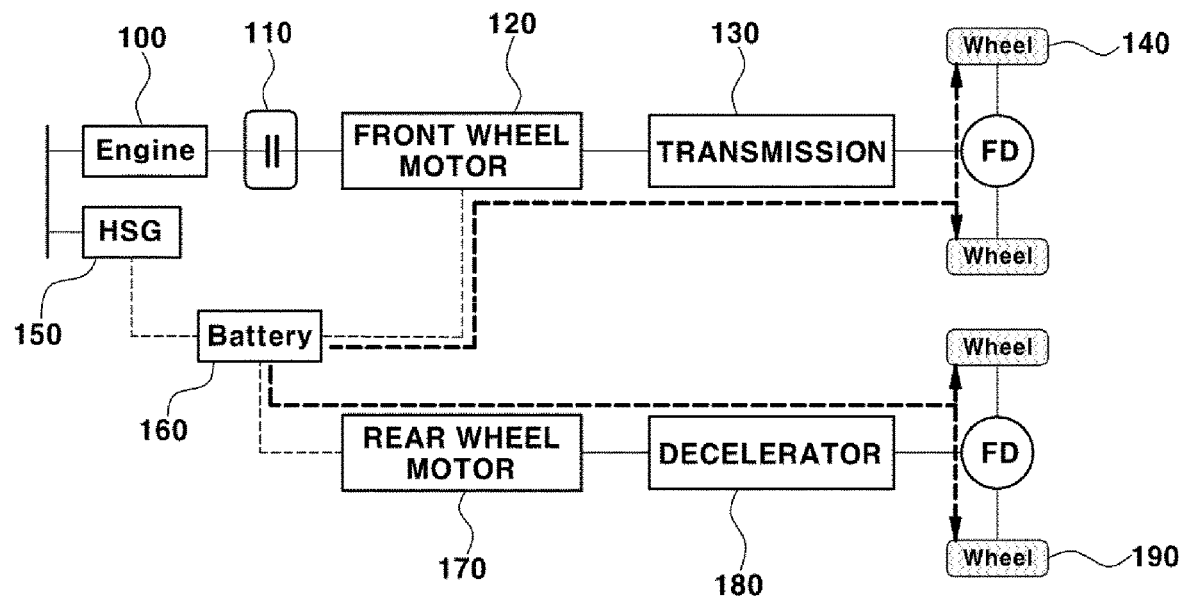
Figure 8:
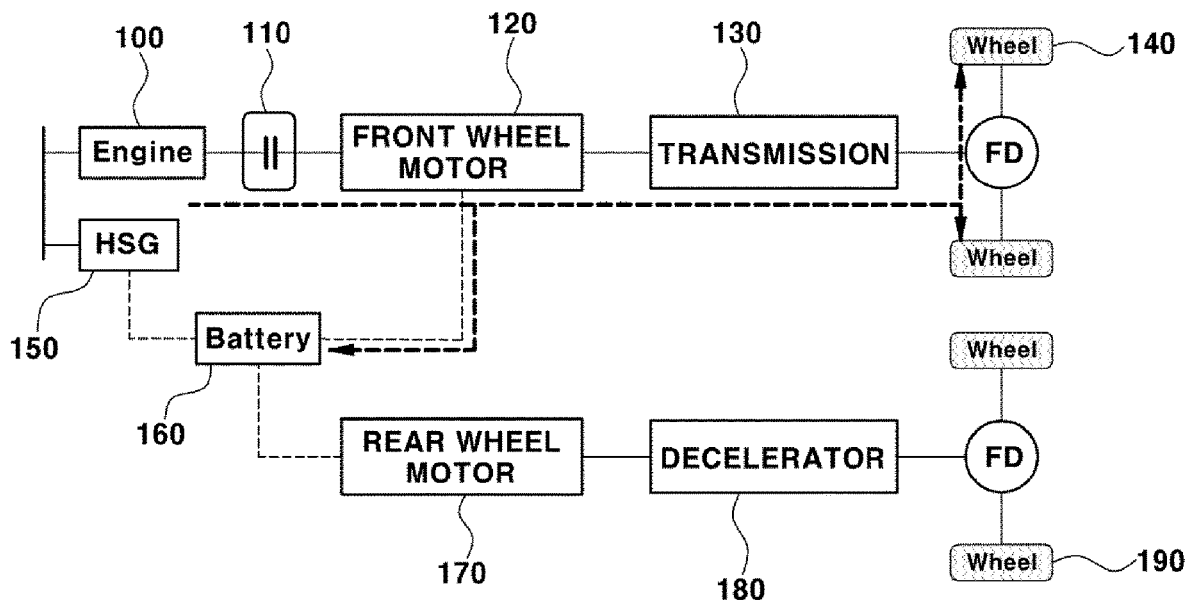
Figure 9:
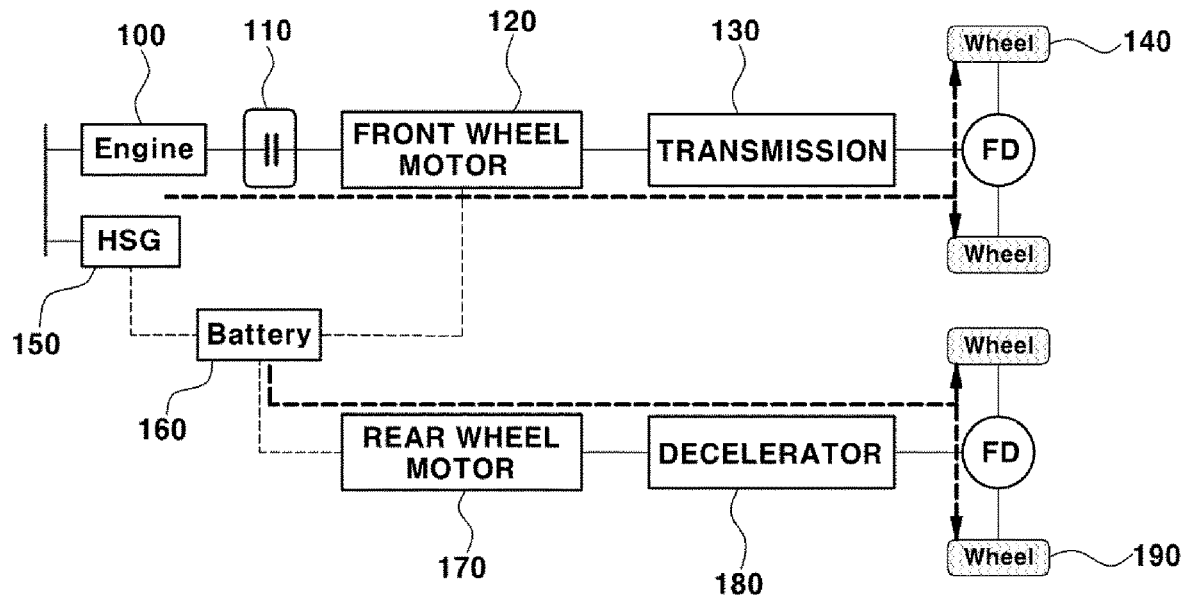
Figure 10:
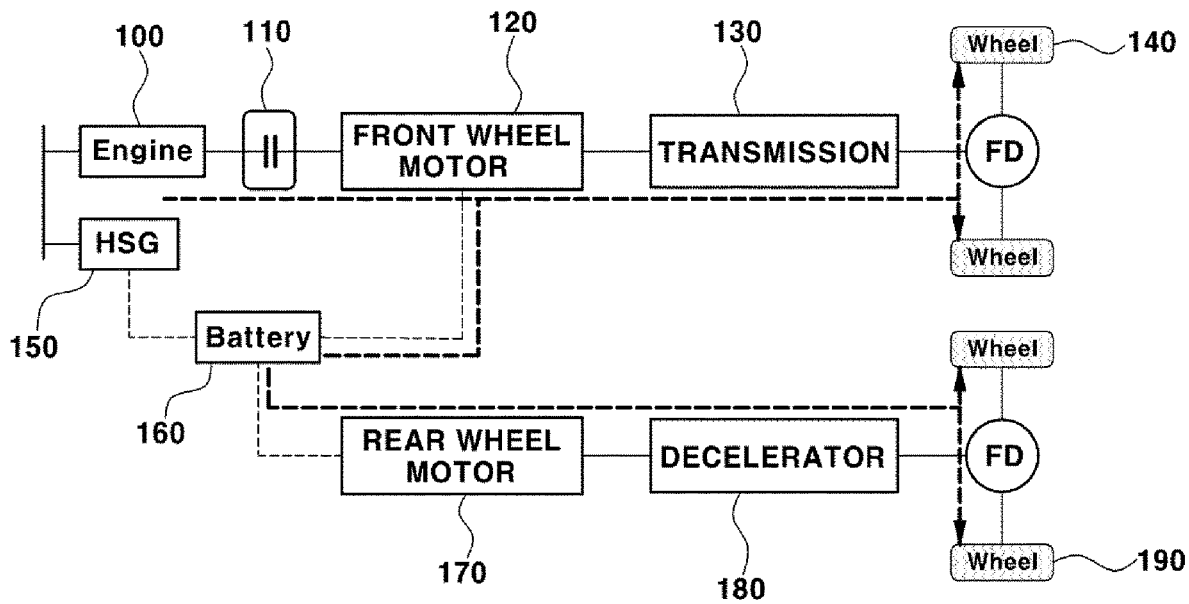

FIG. 7 is a power transmission block diagram illustrating a power transmission process in a front wheel motor and the rear wheel motor driving control mode in the driving control method of the E-4WD vehicle according to one form of the present disclosure; and FIGS. 8 to 10 are power transmission block diagrams illustrating a power transmission process in an engine-on control mode in the driving control method of the E-4WD vehicle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

Figure 1:
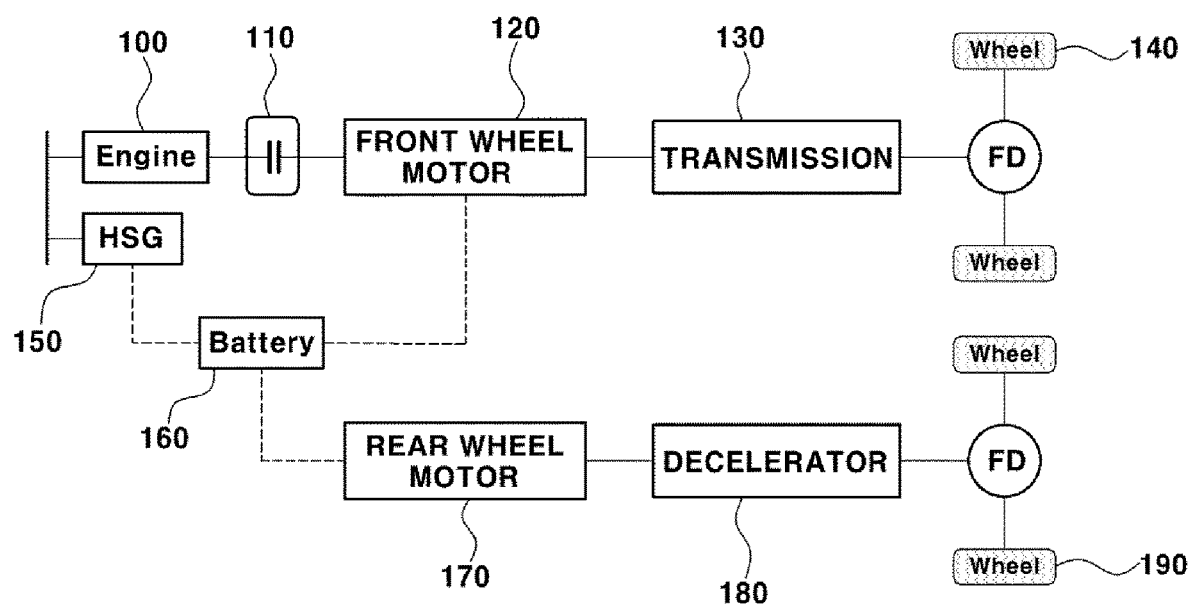
FIG. 1 is a block diagram illustrating power transmission of an electronic four-wheel drive (E-4WD) vehicle.
Figure 2:
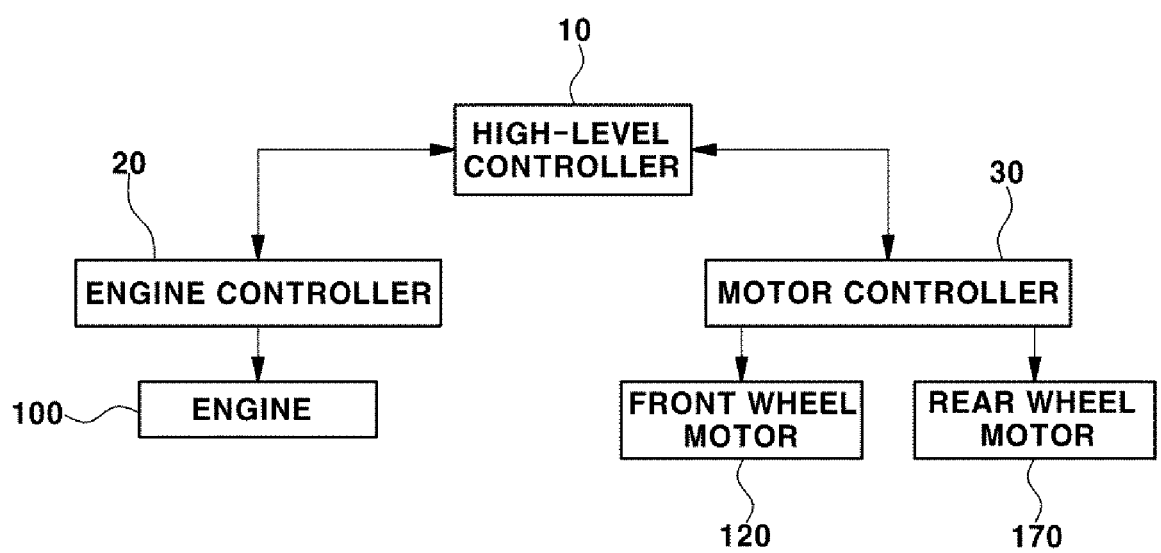
FIG. 2 is a control configuration diagram illustrating a driving control method of an E-4WD vehicle according to one form of the present disclosure.

FIG. 1 is a block diagram illustrating a power transmission of an electronic four-wheel drive (E-4WD) vehicle in which a powertrain for a front wheel with an engine and a front wheel motor and a powertrain for a rear wheel with a rear wheel motor are combined, and FIG. 2 is a control configuration diagram illustrating a driving control method of an E-4WD vehicle according to one form of the present disclosure.

As shown in FIG. 1, the powertrain for a front wheel includes an engine 100, a front wheel motor 120, an engine clutch 110 arranged between the engine 100 and the front wheel motor 120 and configured to transmit or disconnect power of the engine 100, a transmission 130 configured to shift power from the engine 100 and the front wheel motor 120 and output the shifted power to the front wheel 140, a hybrid starter generator (HSG) 150 connected to a crank pulley of the engine 100 and configured to perform a starting of the engine 100 and generate electric power, and a battery 160 connected to the front wheel motor 120 and the HSG 150 to be chargeable and dischargeable.

The transmission 130 may employ an automatic transmission (AT) or a dual clutch transmission (DCT).

The powertrain for a rear wheel includes a rear wheel motor 170 connected to the battery 160 to be chargeable and dischargeable, and a decelerator 180 configured to decelerate power of the rear wheel motor 170 and output the decelerated power to a rear wheel 190.

As described above, the present disclosure focuses on that the driving control for traveling of the E-4WD vehicle, in which the powertrain for a front wheel and the powertrain for a rear wheel are combined, is separately performed in a rear wheel motor driving control mode, a front wheel motor driving control mode, a front wheel motor and rear wheel motor (four-wheel motor) driving control mode, and an engine-on control mode according to driver demand power so that improvement of fuel efficiency may be achieved and marketability of the E-4WD vehicle may be improved.

As shown in FIG. 2, a controller which is a control main body during the driving control for traveling of the E-4WD vehicle may include a high-level controller 10, an engine controller 20 configured to receive a command of the high-level controller 10 and control overall driving and an operating point of the engine 100, and a motor controller 30 configured to receive a torque command from the high-level controller 10 and control overall driving of the front wheel motor 120 and the rear wheel motor 170.

Here, the driving control method of an E-4WD vehicle according to the present disclosure will be described for each control mode as follows.

Figure 3:
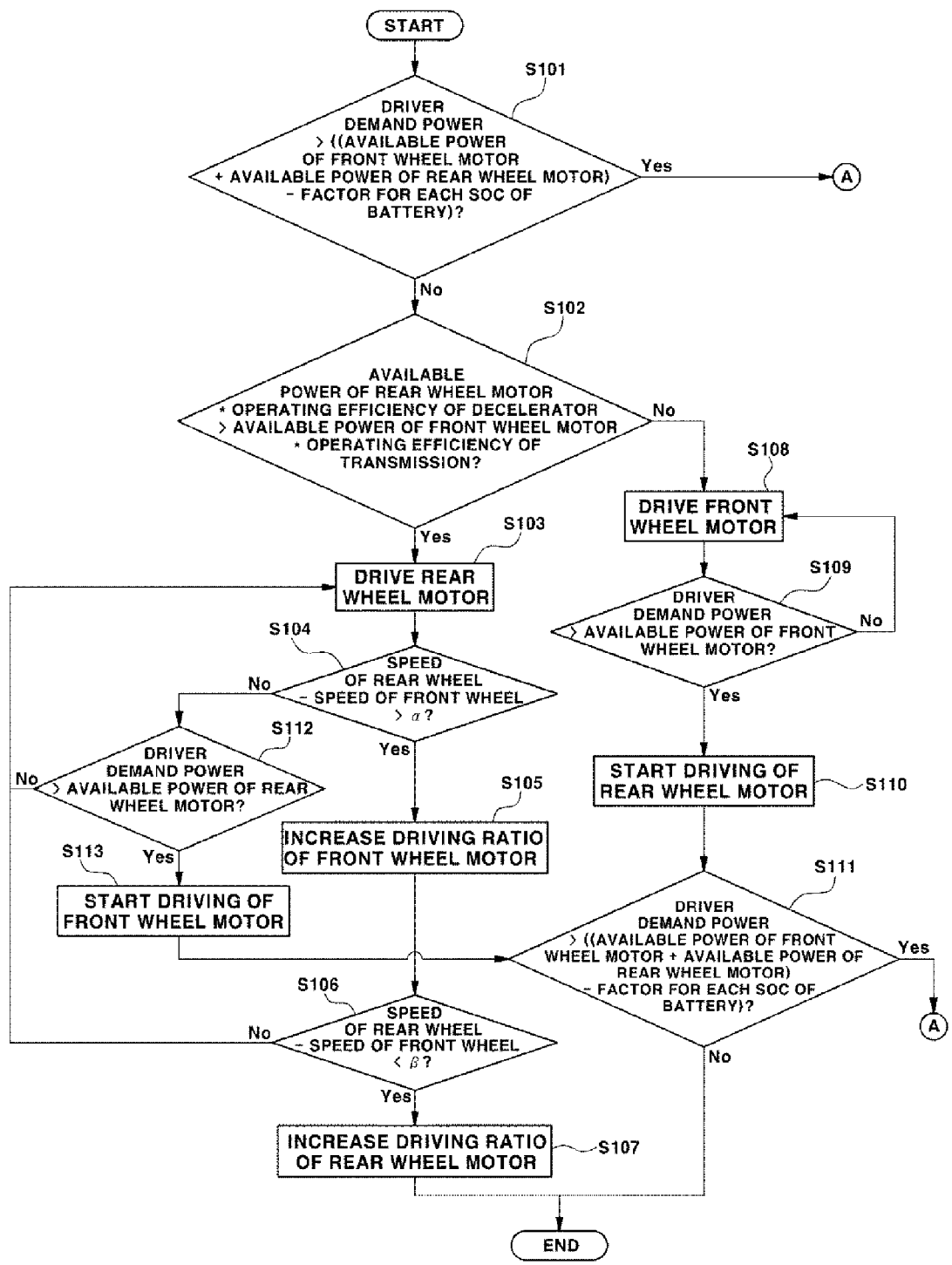
FIGS. 3 and 4 are flowcharts illustrating the driving control method of the E-4WD vehicle according to one form of the present disclosure.
Figure 4:
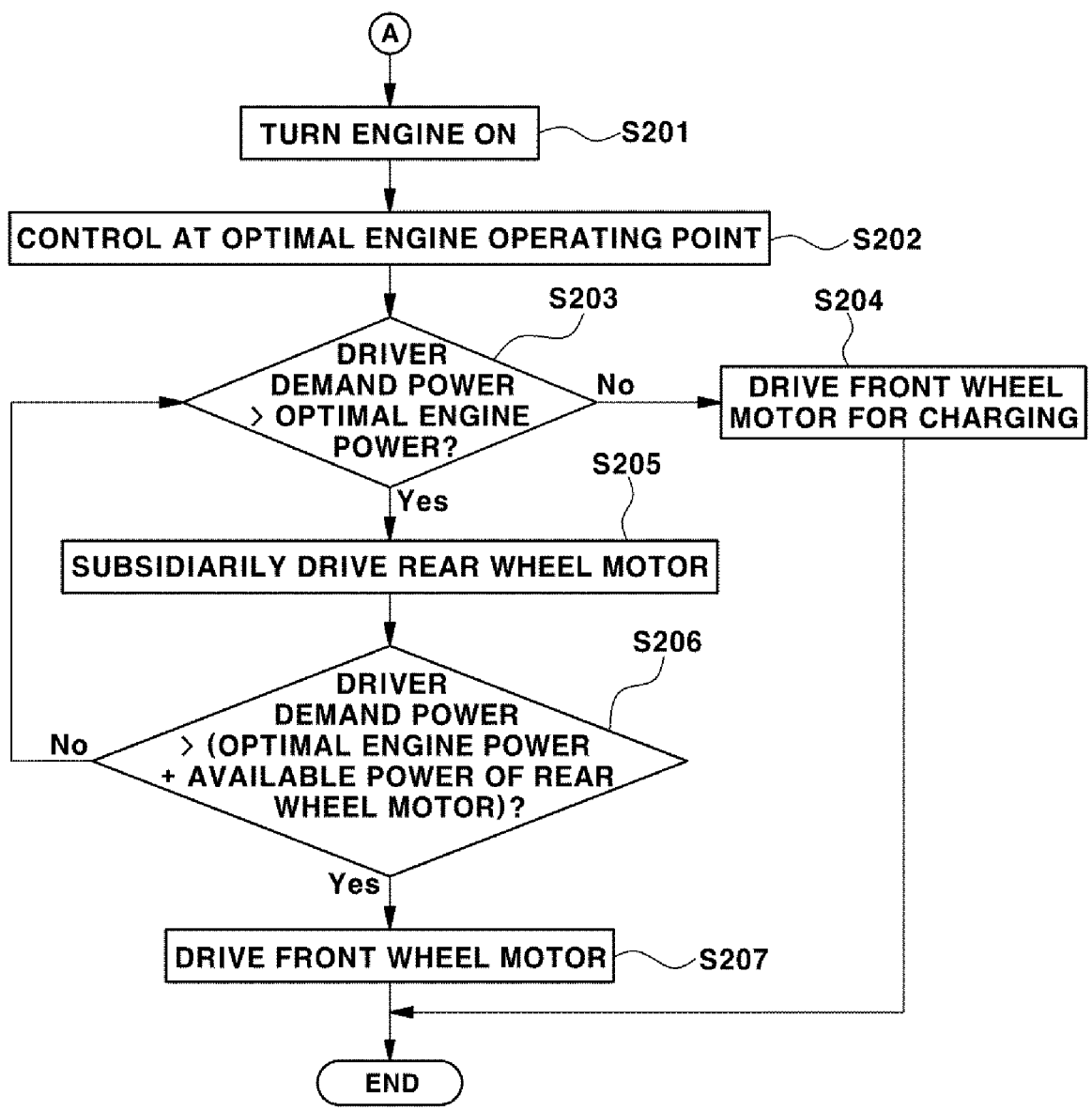

FIGS. 3 and 4 are flowcharts illustrating the driving control method of an E-4WD vehicle according to the present disclosure.

Rear Wheel Motor Driving Control Mode

When driver demand power is smaller than the sum of available power of the front wheel motor 120 and available power of the rear wheel motor 170 (the available power of the front wheel motor 120+ the available power of the rear wheel motor 170), control for selectively driving the front wheel motor 120 and the rear wheel motor 170 is performed in advance according to power transmission efficiency of the front wheel motor 120 and the rear wheel motor 170.

That is, the driver demand power varied according to an amount of stepping on an accelerator pedal of a driver is compared with total available power which is the sum of the available power of the front wheel motor 120 and the available power of the rear wheel motor 170. As the comparison result, when the driver demand power is smaller than the total available power which is the sum of the available power of the front wheel motor 120 and the available power of the rear wheel motor 170, the front wheel motor 120 and the rear wheel motor 170 may be selectively driven for traveling in an electric vehicle (EV) mode.

In this case, when a level of a state of charge (SOC) of the battery 160 is decreased to be equal to or less than a predetermined level, since discharging of the battery 160 should be reduced or minimized, it is desired to limit the traveling in the EV mode. Thus, it is desired to determine driving of only the front wheel motor 120 or only the rear wheel motor 170, or an engine-on timing using a factor for each SOC of the battery 160.

For reference, it is noted that the factor for each SOC of the battery 160 is a mappable variable item.

Therefore, the driver demand power is compared with a difference between the total available power and the factor for each SOC of the battery 160 ((the available power of the front wheel motor 120+ the available power of the rear wheel motor 170)− the factor for each SOC of the battery 160) (S101). As the comparison result, when the driver demand power is smaller than the difference between the total available power and the factor for each SOC of the battery 160, only the front wheel motor 120 or only the rear wheel motor 170 may be driven for the traveling in the EV mode.

Otherwise, when the driver demand power is larger than the difference between the total available power and the factor for each SOC of the battery 160 ((the available power of the front wheel motor 120+ the available power of the rear wheel motor 170)− the factor for each SOC of the battery 160), in order to reduce or minimize the discharging of the battery 160, it is desired to limit the traveling in the EV mode, and thus, as described below, the engine 100 is driven according to an engine-on control mode in which the battery 160 is chargeable.

In one form, the control of selectively driving the front wheel motor 120 and the rear wheel motor 170 includes determining whether to drive either the front wheel motor 120 or the rear wheel motor 170 on the basis of power transmission efficiency of the front wheel motor 120 and the rear wheel motor 170.

To this end, as the comparison result in S101, when the driver demand power is smaller than the difference between the total available power and the factor for each SOC of the battery 160 ((the available power of the front wheel motor 120+ the available power of the rear wheel motor 170)− the factor for each SOC of the battery 160), for the traveling in the EV mode, it is desired to perform the determining of whether to drive either the front wheel motor 120 or the rear wheel motor 170. The reason is to use either the front wheel motor 120 or the rear wheel motor 170, which has better power transmission efficiency with respect to each wheel.

In this case, the power transmission efficiency of the front wheel motor 120 is power transmission efficiency when power of the front wheel motor 120 is output to the front wheel 140 through the transmission 130 and may be determined by operating efficiency of the transmission 130, and the power transmission efficiency of the rear wheel motor 170 is power transmission efficiency when power of the rear wheel motor 170 is output to the rear wheel 190 through the decelerator 180 and may be determined by operating efficiency of the decelerator 180.

Thus, in order to determine whether to drive either the front wheel motor 120 or the rear wheel motor 170 for the traveling in the EV mode, the product of the available power of the front wheel motor 120 and operating efficiency of the transmission 130 (the available power of the front wheel motor 120× the operating efficiency of the transmission 130) is compared with the product of the available power of the rear wheel motor 170 and operating efficiency of the decelerator 180 (the available power of the rear wheel motor 170× the operating efficiency of the decelerator 180) (S102). As the comparison result, when the product of the available power of the rear wheel motor 170 and the operating efficiency of the decelerator 180 (the available power of the rear wheel motor 170× the operating efficiency of the decelerator 180) is larger, only the rear wheel motor 170 is driven for the traveling in the EV mode (S103).

For example, the high-level controller 10 compares the product of the available power of the front wheel motor 120 and the operating efficiency of the transmission 130 (the available power of the front wheel motor 120× the operating efficiency of the transmission 130) with the product of the available power of the rear wheel motor 170 and the operating efficiency of the decelerator 180 (the available power of the rear wheel motor 170× the operating efficiency of the decelerator 180). When the product of the available power of the rear wheel motor 170 and the operating efficiency of the decelerator 180 (the available power of the rear wheel motor 170× the operating efficiency of the decelerator 180) is determined as being larger, the high-level controller 10 commands the motor controller 30 to execute the EV mode so that only the rear wheel motor 170 may be driven due to current control of the motor controller 30.

Figure 5:
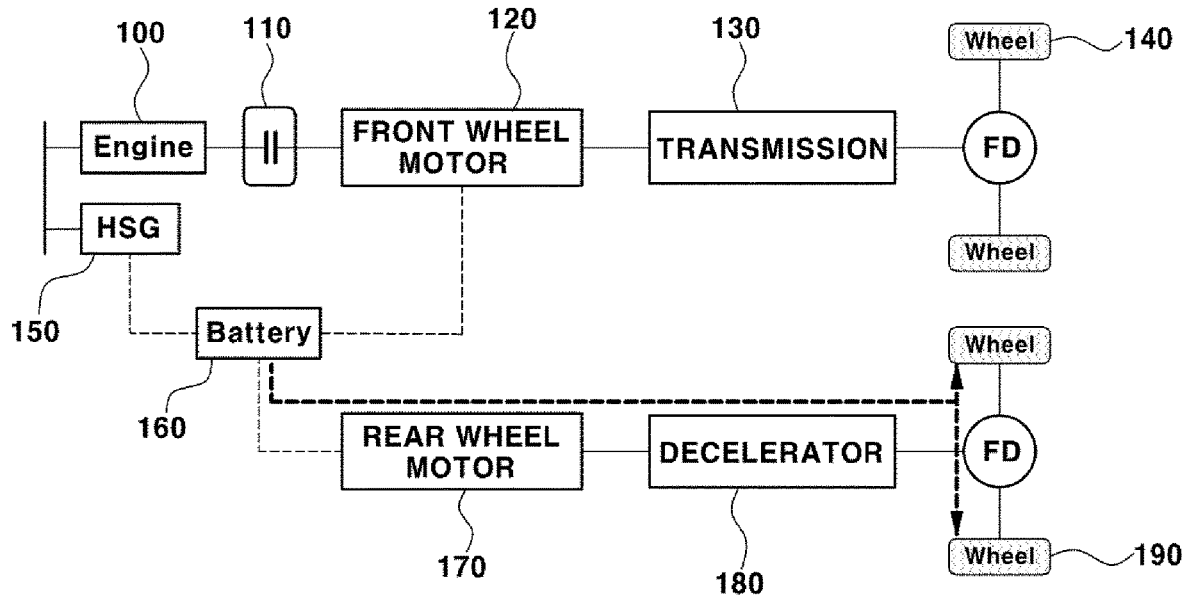
FIG. 5 is a power transmission block diagram illustrating a power transmission process in a rear wheel motor driving control mode in the driving control method of the E-4WD vehicle according to one form of the present disclosure.

Thus, as shown in FIG. 5, when only the rear wheel motor 170 is driven using power of the battery 160, a rotating force of the rear wheel motor 170 is transmitted to the rear wheel 190 through the decelerator 180 so that an initial acceleration traveling of the vehicle may be performed and the driver demand power may be satisfied with the available power of the rear wheel motor 170.

Meanwhile, while the rear wheel 190 is driven using the power of the rear wheel motor 170, when a traveling road surface is a low friction road surface, the rear wheel 190 slips and a speed of the rear wheel 190 is suddenly increased as compared with a speed of the front wheel 140 so that the acceleration traveling of the vehicle may not be smoothly performed and thus traveling stability of the vehicle may be degraded.

In order to solve the above problem, a difference between the speed of the rear wheel 190 and the speed of the front wheel 140 (the speed of the rear wheel 190− the speed of the front wheel 140) is compared with a maximum reference value α (S104). As the comparison result, when the difference between the speed of the rear wheel 190 and the speed of the front wheel 140 is larger than the maximum reference value α, the front wheel motor 120 is driven by increasing a driving ratio of the front wheel motor 120 to the rear wheel motor 170 by as much as a unit of 1% at a predetermined period (e.g., 10 ms) (S105).

For example, when the high-level controller 10 compares the speed of the rear wheel 190 with the speed of the front wheel 140 and determines that the difference between the speed of the rear wheel 190 and the speed of the front wheel 140 (the speed of the rear wheel 190− the speed of the front wheel 140) is larger than the maximum reference value α, the high-level controller 10 commands the motor controller 30 to drive the front wheel motor 120 so that the front wheel motor 120 may be driven according to the current control of the motor controller 30 at a driving ratio which is increased by as much as a unit of 1% at a predetermined period.

In one form, the driving of the front wheel motor 120 by increasing the driving ratio of the front wheel motor 120 by as much as the unit of 1% at the predetermined period (S105) is performed until the difference between the speed of the rear wheel 190 and the speed of the front wheel 140 (the speed of the rear wheel 190– the speed of the front wheel 140) is decreased to be less than a minimum reference value β.

In this case, the difference between the speed of the rear wheel 190 and the speed of the front wheel 140 (the speed of the rear wheel 190– the speed of the front wheel 140) is compared with the minimum reference value β (S106). As the comparison result, when the difference between the speed of the rear wheel 190 and the speed of the front wheel 140 is determined as being less than the minimum reference value β, for stability of the acceleration traveling of the vehicle, a driving ratio of the rear wheel motor 170 to the front wheel motor 120 is contrarily increased by as much as a predetermined unit at a predetermined period (S107).

As described above, the acceleration traveling of the vehicle may be performed due to the driving of only the rear wheel motor 170 while satisfying the driver demand power. In particular, the driving ratios of the front wheel motor 120 and the rear wheel motor 170 are varied so that stable vehicle acceleration may be performed due to the driving of the rear wheel motor 170 on the low friction road surface.

In addition, the small-sized rear wheel motor 170 having a capacity that is smaller than that of the front wheel motor 120 is used so that the traveling in the EV mode for initial acceleration of the vehicle is performed. Consequently, improvement of fuel efficiency may be achieved.

Front Wheel Motor Driving Control Mode

As described above, the driver demand power varied according to the amount of stepping on the accelerator pedal of the driver is compared with the total available power which is the sum of the available power of the front wheel motor 120 and the available power of the rear wheel motor 170. As the comparison result, when the driver demand power is smaller than the total available power which is the sum of the available power of the front wheel motor 120 and the available power of the rear wheel motor 170, the front wheel motor 120 and the rear wheel motor 170 may be selectively driven for the traveling in the EV mode.

In this case, when a level of an SOC of the battery 160 is decreased to be equal to or less than a predetermined level, since discharging of the battery 160 should be reduced or minimized, it is desired to limit the traveling in the EV mode. Thus, it is desired to determine driving of only the rear wheel motor 170 or only the front wheel motor 120, or an engine-on timing using a factor for each SOC of the battery 160.

Therefore, the driver demand power is compared with a difference between the total available power and the factor for each SOC of the battery 160 ((the available power of the front wheel motor 120+ the available power of the rear wheel motor 170)– the factor for each SOC of the battery 160) (S101). As the comparison result, when the driver demand power is smaller than the difference between the total available power and the factor for each SOC of the battery 160, only the rear wheel motor 170 or only the front wheel motor 120 may be driven for the traveling in the EV mode.

Subsequently, as the comparison result in S101, when the driver demand power is smaller than a difference between the total available power and the factor for each SOC of the battery 160 ((the available power of the front wheel motor 120+ the available power of the rear wheel motor 170)– the factor for each SOC of the battery 160), for the traveling in the EV mode as described above, it is desired to perform the determining of whether to drive either the front wheel motor 120 or the rear wheel motor 170. The reason is to use either the front wheel motor 120 or the rear wheel motor 170, which has better power transmission efficiency with respect to each wheel.

Thus, in order to determine whether to drive either the front wheel motor 120 or the rear wheel motor 170 for the traveling in the EV mode, the product of the available power of the front wheel motor 120 and operating efficiency of the transmission 130 (the available power of the front wheel motor 120× the operating efficiency of the transmission 130) is compared with the product of the available power of the rear wheel motor 170 and operating efficiency of the decelerator 180 (the available power of the rear wheel motor 170× the operating efficiency of the decelerator 180) (S102). As the comparison result, when the product of the available power of the rear wheel motor 170 and the operating efficiency of the decelerator 180 (the available power of the rear wheel motor 170× the operating efficiency of the decelerator 180) is smaller, that is, the product of the available power of the front wheel motor 120 and the operating efficiency of the transmission 130 (the available power of the front wheel motor 120× the operating efficiency of the transmission 130) is larger, only the front wheel motor 120 is driven for the traveling in the EV mode (S108).

For example, the high-level controller 10 compares the product of the available power of the front wheel motor 120 and the operating efficiency of the transmission 130 (the available power of the front wheel motor 120× the operating efficiency of the transmission 130) with the product of the available power of the rear wheel motor 170 and the operating efficiency of the decelerator 180 (the available power of the rear wheel motor 170× the operating efficiency of the decelerator 180). When the product of the available power of the front wheel motor 120 and the operating efficiency of the transmission 130 (the available power of the front wheel motor 120× the operating efficiency of the transmission 130) is determined as being larger, the high-level controller 10 commands the motor controller 30 to execute the EV mode so that only the front wheel motor 120 may be driven due to the current control of the motor controller 30.

Figure 6:
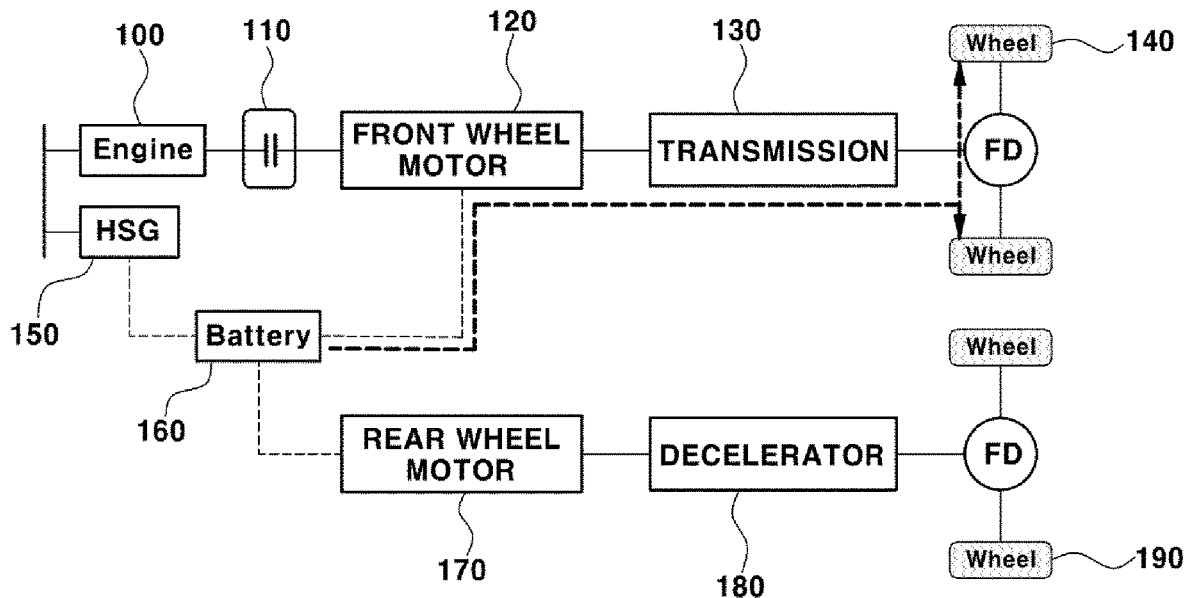
FIG. 6 is a power transmission block diagram illustrating a power transmission process in a front wheel motor driving control mode in the driving control method of the E-4WD vehicle according to one form of the present disclosure.

Thus, as shown in FIG. 6, when the front wheel motor 120 is driven using the power of the battery 160, a rotating force of the front wheel motor 120 is transmitted to the front wheel 140 through the decelerator 180 so that initial acceleration traveling of the vehicle may be performed and the driver demand power may be satisfied with the available power of the front wheel motor 120.

Front Wheel Motor and Rear Wheel Motor Driving Control Mode

When the driver demand power is not satisfied with the available power of the front wheel motor 120 or the available power of the rear wheel motor 170, the front wheel motor and rear wheel motor driving control mode refers to a mode in which the front wheel motor 120 and the rear wheel motor 170 are driven together.

In other words, when the driver demand power is not satisfied with the available power of the front wheel motor 120 or the available power of the rear wheel motor 170, the front wheel motor and rear wheel motor driving control mode refers to a mode in which the front wheel motor 120 is driven together while the rear wheel motor 170 is driven, and the rear wheel motor 170 is driven together while the front wheel motor 120 is driven.

When stable vehicle acceleration is performed due to the driving of only the rear wheel motor 170, that is, when the difference between the speed of the rear wheel 190 and the speed of the front wheel 140 (the speed of the rear wheel 190– the speed of the front wheel 140) is compared with the maximum reference value α (S104) and, as the comparison result, when the difference between the speed of the rear wheel 190 and the speed of the front wheel 140 (the speed of the rear wheel 190– the speed of the front wheel 140) is maintained to be less than the maximum reference value α, the front wheel motor 120 may be driven together with the rear wheel motor 170 according to the driver demand power.

Thus, in a state in which the difference between the speed of the rear wheel 190 and the speed of the front wheel 140 (the speed of the rear wheel 190– the speed of the front wheel 140) is maintained to be less than the maximum reference value α due to the driving of only the rear wheel motor 170, the driver demand power is compared with the available power of the rear wheel motor 170 (S112), and, as the comparison result, when the driver demand power is larger, since the driver demand power cannot be satisfied with only the available power of the rear wheel motor 170, the front wheel motor 120 is driven together with the rear wheel motor 170 (S113).

For example, in the state in which the difference between the speed of the rear wheel 190 and the speed of the front wheel 140 (the speed of the rear wheel 190– the speed of the front wheel 140) is maintained to be less than the maximum reference value α, as the result of comparing the driver demand power with the available power of the rear wheel motor 170, when the driver demand power is larger, the high-level controller 10 commands the motor controller 30 to execute the EV mode so that the driving of the front wheel motor 120 may be further performed due to the current control of the motor controller 30 (S113).

In this case, when the front wheel motor 120 is driven together while the rear wheel motor 170 is driven, power of the rear wheel motor 170 is output as maximum available power thereof, and power of the front wheel motor 120 is output at a level in which the power of the rear wheel motor 170 is subtracted from the driver demand power (the driver demand power– the power of the rear wheel motor 170).

On the contrary, when the stable vehicle acceleration is performed due to the driving of only the front wheel motor 120, the rear wheel motor 170 may be driven together according to the driver demand power.

Thus, the driver demand power is compared with the available power of the front wheel motor 120 (S109), and, as the comparison result, when the driver demand power is larger, since the driver demand power cannot be satisfied with only the available power of the front wheel motor 120, the rear wheel motor 170 is driven together with the front wheel motor 120 (S110).

For example, as the result of comparing the driver demand power with the available power of the front wheel motor 120, when the driver demand power is larger, the high-level controller 10 commands the motor controller 30 to execute the EV mode so that the driving of the rear wheel motor 170 may be further performed due to the current control of the motor controller 30 (S110).

In this case, when the rear wheel motor 170 is driven together while the front wheel motor 120 is driven, the power of the front wheel motor 120 is output as maximum available power thereof, and the power of the rear wheel motor 170 is output at a level in which the power of the front wheel motor 120 is subtracted from the driver demand power (the driver demand power– the power of the front wheel motor 120).

As described above, when the driver demand power is not satisfied with only the available power of the front wheel motor 120 or only the available power of the rear wheel motor 170, the front wheel motor 120 is driven together while the rear wheel motor 170 is driven, and the rear wheel motor 170 is driven together while the front wheel motor is 120 is driven so that the driver demand power may be satisfied. As shown in FIG. 7, 4WD traveling, in which the power of the front wheel motor 120 is output to the front wheel 140 and, simultaneously, the power of the rear wheel motor 170 is output to the rear wheel 190, may be performed.

Engine-On Control Mode

When the driver demand power is larger than (the available power of the front wheel motor 120+ the available power of the rear wheel motor 170), the engine-on control mode refers to a mode in which the traveling in the EV mode is limited so as to reduce or minimize the discharging of the battery 160 and, simultaneously, the engine 100 is turned on so as to satisfy the driver demand power.

As described above, when a level of an SOC of the battery 160 is decreased to be equal to or less than a predetermined level while the front wheel motor 120 and/or the rear wheel motor 170 is driven, it is desired to limit the traveling in the EV mode so as to reduce or minimize the discharging of the battery 160, and thus an engine-on timing may be determined using a factor for each SOC of the battery 160.

Thus, as the result of comparing the driver demand power with a difference between the total available power and the factor for each SOC of the battery 160 ((the available power of the front wheel motor 120+ the available power of the rear wheel motor 170)– the factor for each SOC of the battery 160) in S101, when the driver demand power is larger than the difference between the total available power and the factor for each SOC of the battery 160 ((the available power of the front wheel motor 120+ the available power of the rear wheel motor 170)– the factor for each SOC of the battery 160), the engine 100 is turned on (S201).

In addition, after S110 in which the rear wheel motor 170 is driven together with the front wheel motor 120, or after S113 in which the front wheel motor 120 is driven together with the rear wheel motor 170, when the driver demand power is determined as being larger than the difference between the total available power and the factor for each SOC of the battery 160 ((the available power of the front wheel motor 120+ the available power of the rear wheel motor 170)– the factor for each SOC of the battery 160), the engine 100 is turned on (S201).

For example, when the high-level controller 10 determines that the driver demand power is larger than the difference between the total available power and the factor for each SOC of the battery 160 ((the available power of the front wheel motor 120+ the available power of the rear wheel motor 170)– the factor for each SOC of the battery 160), the engine controller 20 controls the engine to be turned on according to a command of the high-level controller 10.

In one form, the engine controller 20 controls the driving of the engine 100 at a preset optimal engine operating point for improving fuel efficiency according to the command of the high-level controller 10 (S202).

Accordingly, in a state in which the engine 100 is driven, a hybrid electric vehicle (HEV) traveling mode may be implemented in which the front wheel motor 120 or the rear wheel motor 170 is driven together or the front wheel motor 120 and the rear wheel motor 170 are driven simultaneously.

In this case, while the engine 100 is driven at the preset optimal engine operating point, the driver demand power is compared with optimal engine power when the engine 100 is driven at the preset optimal engine operating point (S203). As the comparison result, when the driver demand power is smaller than the optimal engine power, that is, the optimal engine power is larger than the driver demand power, the front wheel motor 120 performs power generation for charging the battery 160 (S204).

In other words, when the optimal engine power is larger than the driver demand power, it indicates that the driver demand power may be satisfied with the optimal engine power. Thus, as shown in FIG. 8, the power of the engine 100 is output to the front wheel 140 and, simultaneously, the front wheel motor 120 is driven as an electric generator so that the battery 160 may be charged.

Otherwise, as the result of comparing the driver demand power with the optimal engine power when the engine 100 is driven at the preset optimal engine operating point in S203, when the driver demand power is larger than the optimal engine power, that is, the optimal engine power is smaller than the driver demand power, since it indicates that the driver demand power cannot be satisfied with the optimal engine power, the rear wheel motor 170 may be used as an auxiliary driving source so as to satisfy the driver demand power.

To this end, as the result of comparing the driver demand power with the optimal engine power, when the engine 100 is driven at the preset optimal engine operating point in S203 and the driver demand power is larger than the optimal engine power, that is, the optimal engine power is smaller than the driver demand power, the rear wheel motor 170 may be used as an auxiliary driving source under the control of the motor controller 30 according to a command of the high-level controller 10 (S205).

In another form, auxiliary driving power of the rear wheel motor 170 may be determined as a value obtained by subtracting the optimal engine power from the driver demand power (the driver demand power− the optimal engine power).

In this case, the reason why the rear wheel motor 170 is driven as the auxiliary power source is that a length and efficiency of a power transmission path for transmitting power from the rear wheel motor 170 to the rear wheel 190 via the decelerator 180 are shorter and better as compared with those of a power transmission path for transmitting power from the front wheel motor 120 to the front wheel 140 via the transmission 130.

Therefore, as shown in FIG. 9, the power of the engine 100 is output to the front wheel 140 and, simultaneously, the power of the rear wheel motor 170 is output to the rear wheel 190 so that an HEV mode in which the vehicle is traveling using both the power of the engine 100 and the power of the rear wheel motor 170 may be implemented and, simultaneously, 4WD traveling may be performed.

Next, the driver demand power is compared with the sum of the optimal engine power and the available power of the rear wheel motor 170 (the optimal engine power+ the available power of the rear wheel motor 170) (S206). As the comparison result, when the driver demand power is larger, it indicates that the driver demand power is not satisfied with the sum of the optimal engine power and the available power of the rear wheel motor 170. Thus, in order to satisfy the driver demand power, in addition to the rear wheel motor 170, the front wheel motor 120 is also driven to be used as a traveling power source under the control of the motor controller 30 according to the command of the high-level controller 10 (S207).

In some forms of the present disclosure, driving power of the front wheel motor 120 may be determined as a value obtained by subtracting the sum of the optimal engine power and the available power of the rear wheel motor 170 from the driver demand power (the driver demand power− (the optimal engine power+ the available power of the rear wheel motor 170)).

Therefore, as shown in FIG. 10, the power of the engine 100 and the power of the front wheel motor 120 are output to the front wheel 140 and, simultaneously, the power of the rear wheel motor 170 is output to the rear wheel 190 so that an HEV mode for high load traveling may be implemented using both the power of the front wheel motor 120 and the rear wheel motor 170 in addition to the power of the engine 100 and, simultaneously, the 4WD traveling may be performed.

The present disclosure provides the following effects through the above-described problem solving means.

First, in accordance with the present disclosure, traveling driving control of an E-4WD vehicle, in which a powertrain for a front wheel including an engine and a front wheel motor and a powertrain for a rear wheel including a rear wheel motor are combined, can be separately performed in a rear wheel motor driving control mode, a front wheel motor driving control mode, a front wheel motor and rear wheel motor driving control mode, and an engine-on control mode according to driver demand power so that improvement of fuel efficiency can be achieved and marketability of the E-4WD vehicle can be improved.

Second, vehicle traveling which satisfies the driver demand power can be achieved in an entire load area of the E-4WD vehicle.

Third, driving ratios of the front wheel motor and the rear wheel motor are adjusted so that stable vehicle acceleration can be performed on a low friction road surface.

Although the forms of the present disclosure have been described in detail, the scope of the prevent disclosure is not limited to these forms, and various modifications and improvements devised by those skilled in the art using the fundamental concept of the present disclosure, which is defined by the appended claims, may further fall within the scope of the present disclosure.

What is claimed is:
1. A device for controlling an electronic four-wheel drive (E-4WD) for a vehicle, the device comprising:
   a first powertrain for a front wheel,
      wherein the first powertrain includes:
         an engine, a front wheel motor, an engine clutch which is arranged between the engine and the front wheel motor and configured to selectively transmit power of the engine, and
         a transmission configured to shift the power of the engine and power of the front wheel motor and output the shifted power to the front wheel;
   a second powertrain for a rear wheel,
      wherein the second powertrain includes:
         a rear wheel motor, and
         a decelerator configured to decelerate power of the rear wheel motor and output the decelerated power to the rear wheel;
   a battery connected to the front wheel motor and the rear wheel motor; and a controller configured to:
selectively operate the front wheel motor or the rear wheel motor when a driver power demand for the vehicle is less than a sum of an available power from the front wheel motor and an available power from the rear wheel motor,
while either the front wheel motor or the rear wheel motor is operating, additionally operate either the rear wheel motor or the front wheel motor when the driver power demand for the vehicle is greater than an available power of the front wheel motor or an available power of the rear wheel motor, and
operate the engine when the driver power demand is greater than the sum of the available powers from the front wheel motor and the rear wheel motor.

2. The device of claim 1, wherein, when the driver power demand is less than a difference between the sum of the available powers and a factor for each state of charge (SOC) of the battery, the controller is configured to selectively operate the rear wheel motor or the front wheel motor to operate the vehicle in an electric vehicle (EV) mode.

3. The device of claim 1, wherein:
the controller is configured to determine, based on a power transmission efficiency the front wheel motor and the rear wheel motor, whether to operate the front wheel motor or the rear wheel motor, when selectively operating the front wheel motor or the rear wheel motor;
the power transmission efficiency of the front wheel motor is a power transmission efficiency when a power of the front wheel motor is output to the front wheel through the transmission and is determined by an operating efficiency of the transmission; and
the power transmission efficiency of the rear wheel motor is a power transmission efficiency when a power of the rear wheel motor is output to the rear wheel through the decelerator and is determined by an operating efficiency of the decelerator.

4. The device of claim 3, wherein:
when determining whether to operate the front wheel motor or the rear wheel motor, the available power of the front wheel motor multiplied by the operating efficiency of the transmission is compared with the available power of the rear wheel motor multiplied by the operating efficiency of the decelerator; and
when the multiplied available power of the rear wheel motor by the operating efficiency of the decelerator is greater than the multiplied available power of the front wheel motor by the operating efficiency of the transmission, the controller is configured to operate only the rear wheel motor to run the vehicle in an electric vehicle (EV) mode.

5. The device of claim 3, wherein:
when determining whether to operate the front wheel motor or the rear wheel motor, the available power of the front wheel motor multiplied by the operating efficiency of the transmission is compared with the available power of the rear wheel motor multiplied by the operating efficiency of the decelerator; and
when the multiplied available power of the front wheel motor by the operating efficiency of the transmission is greater than the multiplied available power of the rear wheel motor by the operating efficiency of the decelerator, the controller is configured to operate only the front wheel motor to run the vehicle in an electric vehicle (EV) mode.

6. The device of claim 1, wherein, when initial acceleration of the vehicle is performed only by the rear wheel motor, the controller is configured to:
drive the front wheel motor when a difference between a speed of the rear wheel and a speed of the front wheel is greater than a maximum reference value ($\alpha$), and
increase a driving ratio of the front wheel motor to the rear wheel motor with a predetermined unit value at a predetermined interval until a difference between the speed of the rear wheel and the speed of the front wheel is reduced to be less than a minimum reference value ($\beta$), and
when the difference between the speed of the rear wheel and the speed of the front wheel is determined as being less than the minimum reference value ($\beta$), the controller is configured to increase the driving ratio of the rear wheel motor to the front wheel motor with a predetermined unit value at a predetermined interval.

7. The device of claim 1, wherein:
when a difference between a speed of the rear wheel driven only by the rear wheel motor and a speed of the front wheel is less than a maximum reference value ($\alpha$) and the driver power demand is greater than the available power of the rear wheel motor, the controller is configured to further operate the front wheel motor together with the rear wheel motor; and
while only the front wheel motor is driven, when the driver power demand is larger than the available power of the front wheel motor, the controller is configured to further operate the rear wheel motor together with the front wheel motor.

8. The device of claim 1, wherein, when the driver power demand for the vehicle is greater than a difference between the sum of the available powers and a factor for each state of charge (SOC) of the battery, the controller is configured to operate the engine and run the vehicle in a hybrid electric vehicle (HEV) mode.

9. The device of claim 8, wherein:
the controller is configured to compare the driver power demand with an optimal engine power when the engine is driven at an optimal engine operating point;
when the driver power demand is less than the optimal engine power, the front wheel motor is configured to generate power to charge the battery;
the controller is configured to compare the driver power demand with the optimal engine power when the engine is driven at the optimal engine operating point; and
when the driver power demand is greater than the optimal engine power, the rear wheel motor is driven as an auxiliary power source.

10. The device of claim 8, wherein, when the driver power demand is greater than a sum of an optimal engine power and the available power of the rear wheel motor, the controller is configured to drive the front wheel motor such that the front wheel motor is used as a traveling power source in addition to the rear wheel motor.

11. A method of controlling an electronic four-wheel drive (E-4WD) for a vehicle having a first powertrain for a front wheel, a second powertrain for a rear wheel, and a battery, where the first powertrain includes: an engine, a front wheel motor, an engine clutch arranged between the engine and the front wheel motor, and a transmission to shift a power of the engine and a power of the front wheel motor and output the shifted power to the front wheel, and the second powertrain includes: a rear wheel motor and a decelerator to decelerate a power of the rear wheel motor and output the decelerated power to the rear wheel, the method comprising:

selectively, by a controller, driving the front wheel motor or the rear wheel motor based on a power transmission efficiency of the front wheel motor and the rear wheel motor when a driver power demand for the vehicle is less than a sum of an available power from the front wheel motor and an available power from the rear wheel motor;

driving, by the controller, the front wheel motor and the rear wheel motor together when the driver power demand is greater than the available power of the front wheel motor or the available power of the rear wheel motor while either the front wheel motor or the rear wheel motor is driven; and when the driver power demand is greater than the sum of the available powers, driving, by the controller, the engine.

12. The method of claim 11, wherein, in selectively driving the front wheel motor or the rear wheel motor, when the driver power demand is less than a difference between the sum of the available powers and a factor for each state of charge (SOC) of the battery, the rear wheel motor or the front wheel motor is selectively driven to travel the vehicle in an electric vehicle (EV) mode.

13. The method of claim 11, wherein:

the power transmission efficiency of the front wheel motor is a power transmission efficiency when the power of the front wheel motor is output to the front wheel through the transmission and is determined by an operating efficiency of the transmission; and the power transmission efficiency of the rear wheel motor is a power transmission efficiency when the power of the rear wheel motor is output to the rear wheel through the decelerator and is determined by an operating efficiency of the decelerator.

14. The method of claim 13, wherein, in determining whether to drive either the front wheel motor or the rear wheel motor, the available power of the front wheel motor multiplied by the operating efficiency of the transmission is compared with the available power of the rear wheel motor multiplied by the operating efficiency of the decelerator; and wherein when the multiplied available power of the rear wheel motor by the operating efficiency of the decelerator is greater than the multiplied available power of the front wheel motor by the operating efficiency of the transmission, only the rear wheel motor is driven to run the vehicle in an electric vehicle (EV) mode.

15. The method of claim 13, wherein, in determining whether to drive either the front wheel motor or the rear wheel motor, the available power of the front wheel motor multiplied by the operating efficiency of the transmission is compared with the available power of the rear wheel motor multiplied by the operating efficiency of the decelerator; and wherein when the multiplied available power of the front wheel motor by the operating efficiency of the transmission is greater than the multiplied available power of the rear wheel motor by the operating efficiency of the decelerator, only the front wheel motor is driven to run the vehicle in an electric vehicle (EV) mode.

16. The method of claim 11, wherein:

when an initial acceleration of the vehicle is performed by the rear wheel motor, the front wheel motor is driven when a difference between a speed of the rear wheel and a speed of the front wheel is greater than a maximum reference value ($\alpha$), and a driving ratio of the front wheel motor to the rear wheel motor is increased with a predetermined unit value at a predetermined interval until the difference between the speed of the rear wheel and the speed of the front wheel is reduced to be less than a minimum reference value ($\beta$); and when the difference between the speed of the rear wheel and the speed of the front wheel is less than the minimum reference value ($\beta$), a driving ratio of the rear wheel motor to the front wheel motor is contrarily increased with a predetermined unit value at a predetermined period.

17. The method of claim 11, wherein:

when a difference between a speed of the rear wheel and a speed of the front wheel is less than a maximum reference value ($\alpha$) due to driving of only the rear wheel motor, and when the driver power demand is greater than the available power of the rear wheel motor, the front wheel motor is driven together with the rear wheel motor; and when the driver power demand is greater than the available power of the front wheel motor, the rear wheel motor is driven together with the front wheel motor.

18. The method of claim 11, wherein when the driver power demand for the vehicle is greater than a difference between the sum of the available powers and a factor for each state of charge (SOC) of the battery, the engine is driven to run the vehicle in in an hybrid electric vehicle (HEV) mode.

19. The method of claim 18, wherein, in driving the engine, the driver power demand for the vehicle is compared with an optimal engine power when the engine is driven at an optimal engine operating point, when the driver power demand is less than the optimal engine power, the front wheel motor generate power to charge the battery;

the driver power demand is compared with the optimal engine power when the engine is driven at the optimal engine operating point; and when the driver power demand is greater than the optimal engine power, the rear wheel motor is driven as an auxiliary power source.

20. The method of claim 18, wherein, in driving the engine, when the driver power demand is greater than a sum of the optimal engine power and the available power of the rear wheel motor, the front wheel motor is driven to be used as a traveling power source in addition to the rear wheel motor.

* * * * *